United States Patent [19]

Davis

[11] 4,310,225
[45] Jan. 12, 1982

[54] OPHTHALMIC LENS SERIES

[75] Inventor: John K. Davis, East Woodstock, Conn.

[73] Assignee: Gentex Corporation, Carbondale, Pa.

[21] Appl. No.: 63,706

[22] Filed: Aug. 6, 1979

[51] Int. Cl.³ .............................................. G02C 7/02
[52] U.S. Cl. .................................................... 351/176
[58] Field of Search ................................. 351/159, 176

[56] References Cited

U.S. PATENT DOCUMENTS 3,434,781 3/1969 Davis et al. ...................... 351/176 X
3,645,610 2/1972 Duckwall et al. ................... 351/159
3,960,442 6/1976 Davis et al. ....................... 351/159 X

*Primary Examiner*—John K. Corbin
*Assistant Examiner*—Scott J. Sugarman
*Attorney, Agent, or Firm*—Shenier & O'Connor

[57] ABSTRACT

An ophthalmic prescription lens series in which each lens has a concave rear base curve selected from a family of curves, differing in nominal power by steps of 0.50 D, in such a manner as to minimize the maximum in absolute value of the astigmatic error for distant points, the positive power error for distant points, half the negative power error for distant points, and the astigmatic error for a near point of approximately 40 centimeters. The errors are computed for an approximate angle of 28° between the line of sight of the wearer and the optical axis of the lens for both major meridians of the lens, for a first eye-to-lens distance measured from the nasal bevel of the lens to the center of rotation of the eye of approximately 24 millimeters, and for a second eye-to-lens distance similarly defined of approximately 34 millimeters for prescriptions between approximately +2.00 and −2.00 D and 32 millimeters for other prescriptions. Refractive errors are further minimized by the use of true-power concave surfaces, the curvatures of which take into account the index of refraction of the material of which the lens is formed, and by the selection of concave base curves with the assumption of a central power bias or offset of about +0.04 to +0.10 D for plus lenses and about −0.04 to −0.10 D for minus lenses to compensate for off-axis power errors.

26 Claims, 12 Drawing Figures

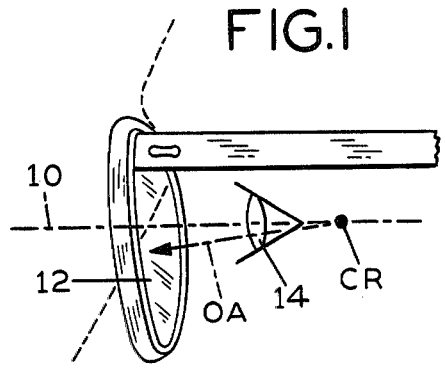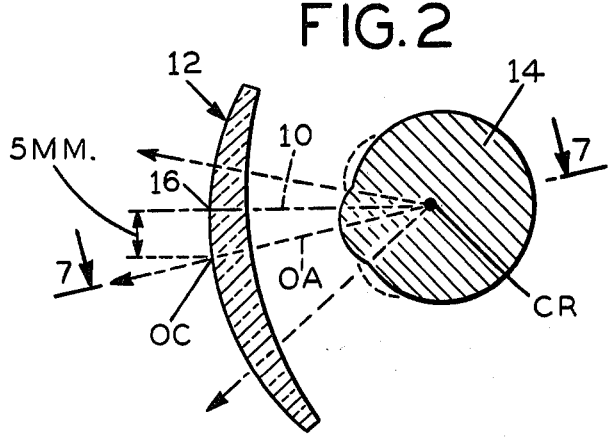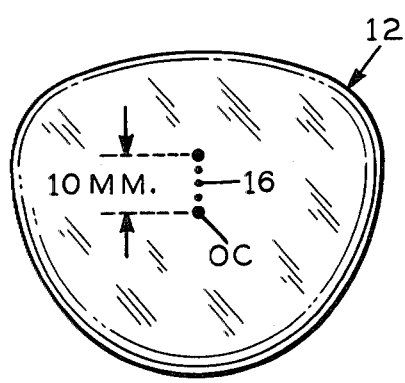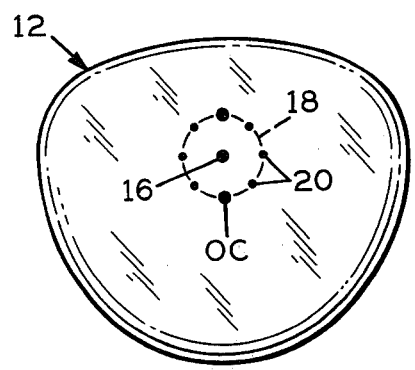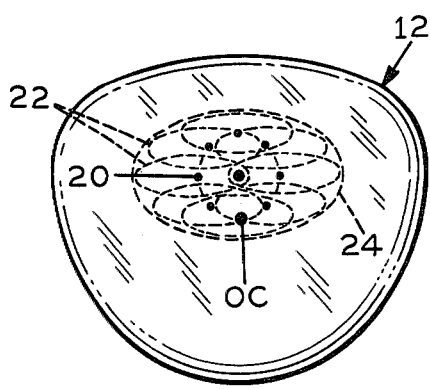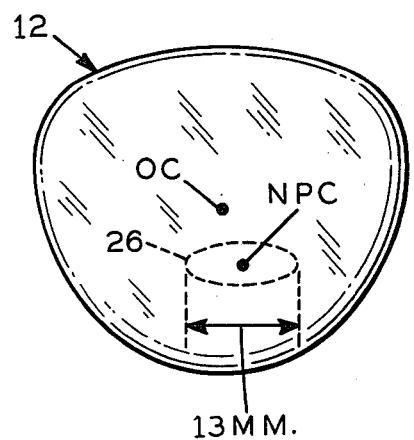

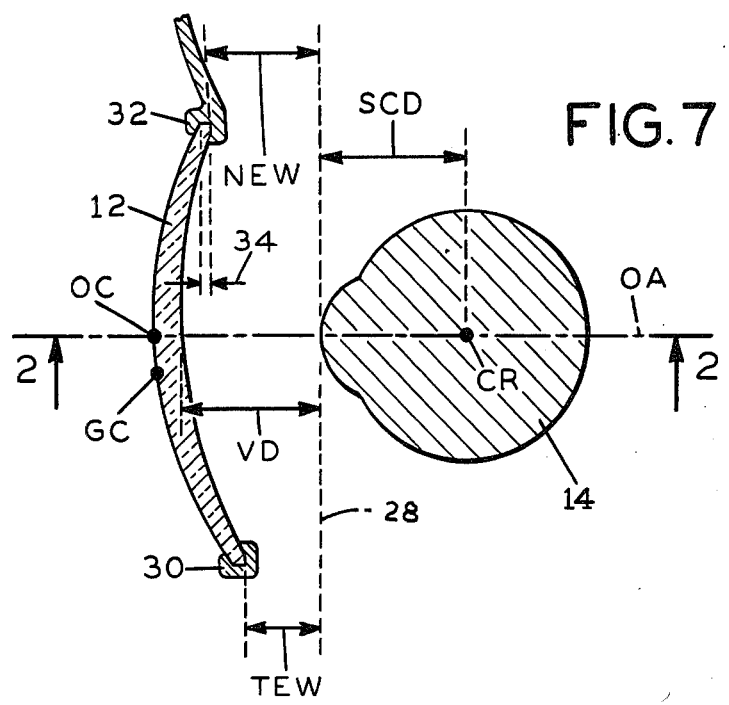
FIG. 7
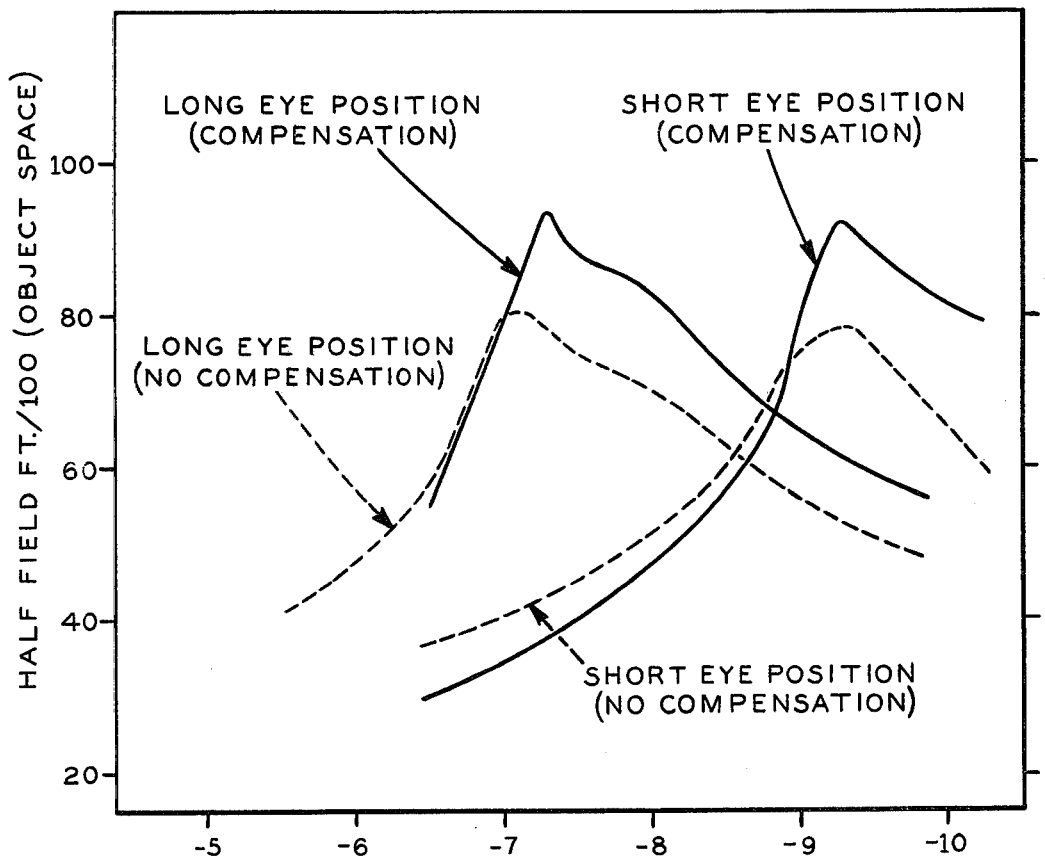
FIG. 8  FIELD OF VIEW VS. CONCAVE BASE CURVE FOR VARIOUS CENTRAL POWER COMPENSATIONS

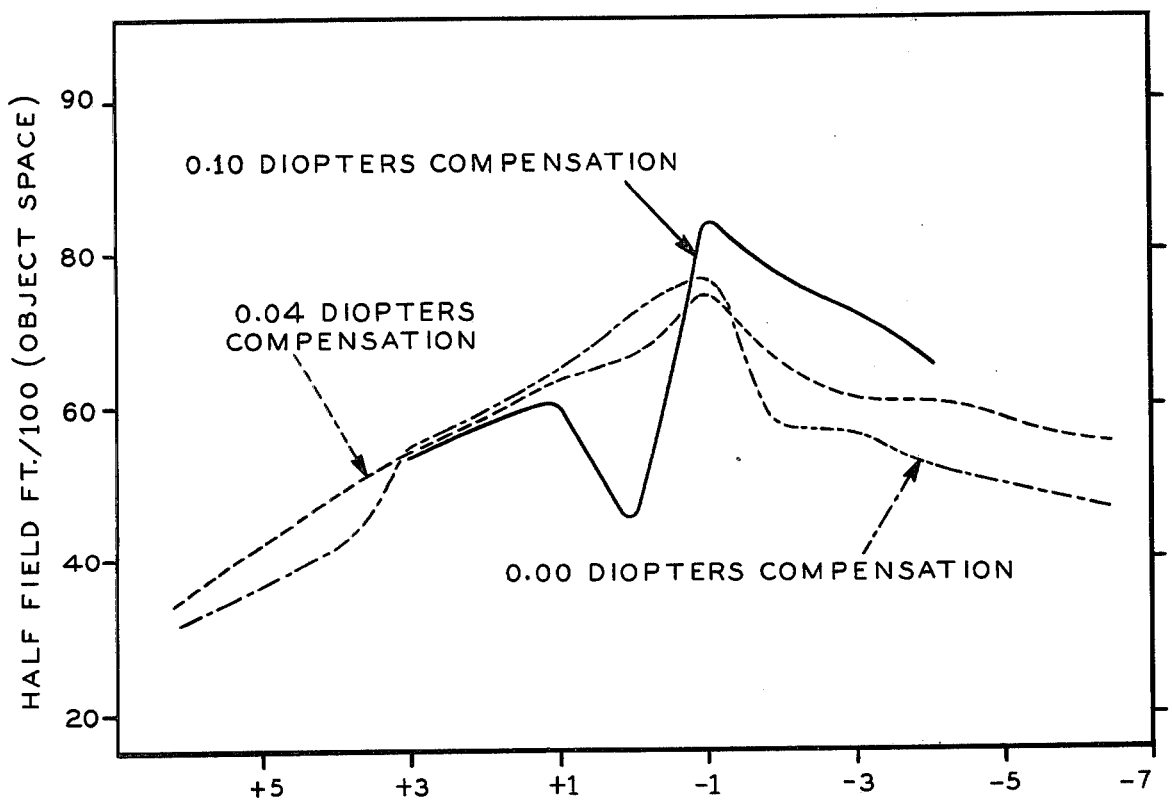
FIG.9 SPHERE PRESCRIPTION
FIELD OF VIEW VS. SPHERE PRESCRIPTION
FOR VARIOUS CENTRAL POWER COMPENSATIONS
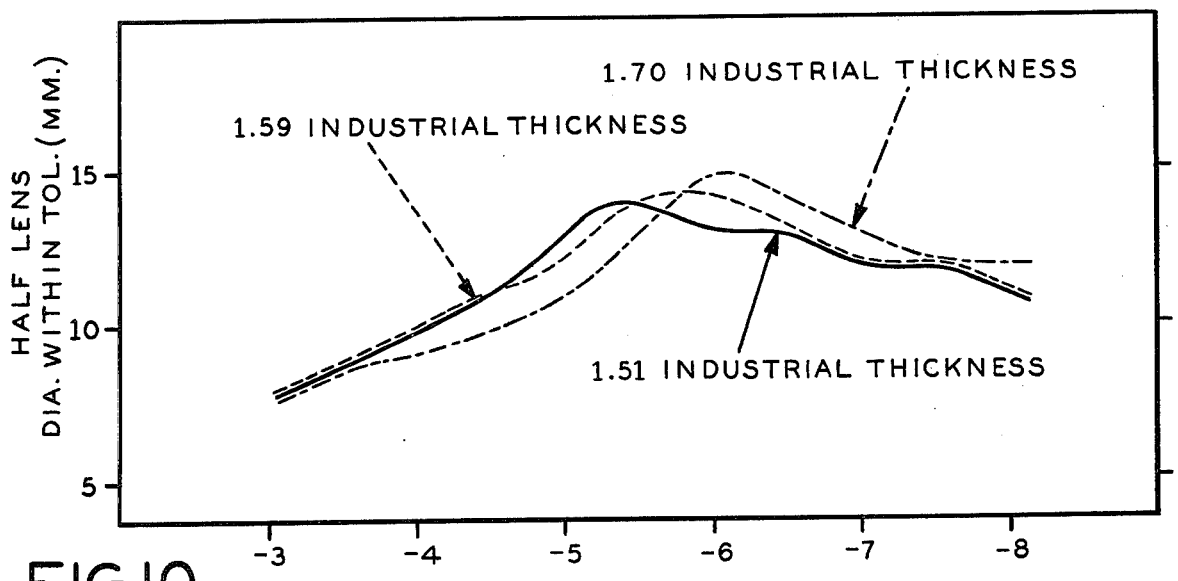
FIG.10  1.53 CONCAVE BASE CURVE
FIELD OF VIEW VS. CONCAVE BASE CURVE FOR VARIOUS
INDICES OF REFRACTION OF +3.00 DS -2.00 DC LENS

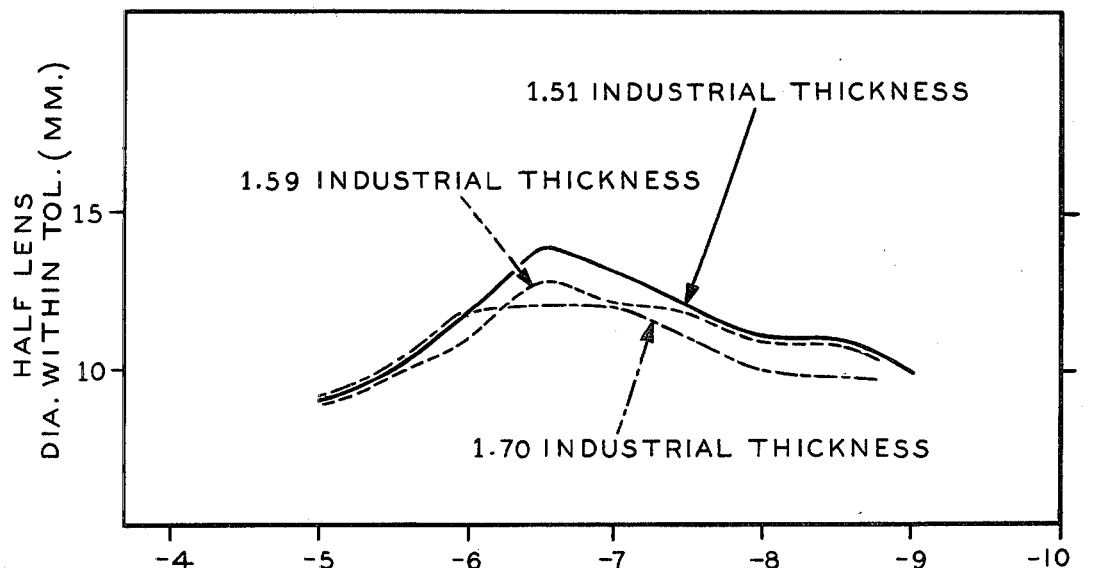
FIG.11 FIELD OF VIEW VS. CONCAVE BASE CURVE FOR VARIOUS INDICES OF REFRACTION OF -3.00 DS -2.00 DC LENS
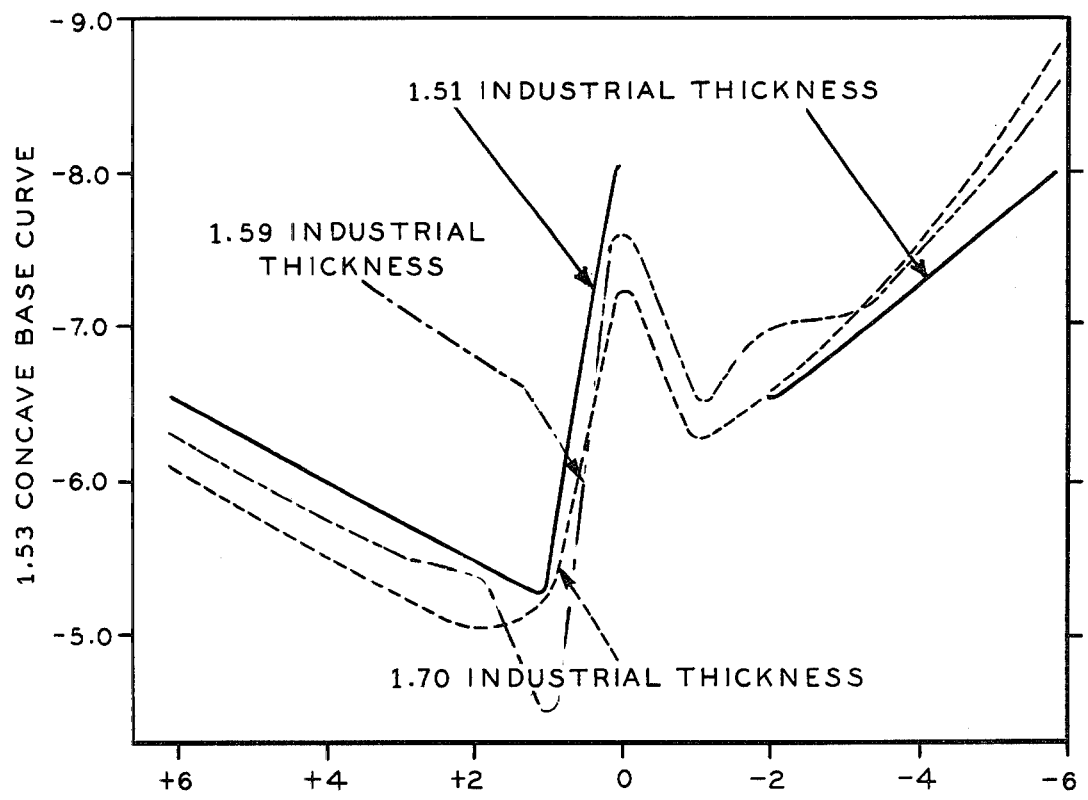
FIG.12 OPTIMUM CONCAVE BASE CURVE VS. SPHERE PRESCRIPTION FOR VARIOUS INDICES OF REFRACTION

OPHTHALMIC LENS SERIES

BACKGROUND OF THE INVENTION

This invention relates to the design of an ophthalmic lens series and, especially, to a molded polycarbonate ophthalmic lens series.

The design of a series of ophthalmic lenses providing optimal correction with a limited number of front and back lens curvatures has been a subject of extensive study. Articles discussing the problems of designing a lens series or individual lenses thereof include J. K. Davis, "Stock Lenses and Custom Design," *Am. J. Optom. & Arch. Am. Acad. Optom.* 44(11):776-801(1967); J. K. Davis, H. G. Fernald & A. W. Rayner, "The Design of a General Purpose Single Vision Lens Series," *Am. J. Optom. & Arch. Am. Acad. Optom.* 42(4):203-36(1965); and J. K. Davis, H. G. Fernald & A. W. Rayner, "An Analysis of Ophthalmic Lens Design," *Am. J. Optom. & Arch. Am. Acad. Optom.* 41(7):400-21(1964). Recent patents disclosing such lens series include U.S. Pat. Nos. 3,960,442 and 3,169,247, issued to J. K. Davis and H. G. Fernald, and U.S. Pat. No. 3,434,781, issued to J. K. Davis, H. G. Fernald and A. W. Rayner.

Traditionally, the individual lenses of a series are designed by selecting the front and back curvatures so as to optimize one or more error criteria at selected off-axis points while providing no intended refraction error at the optical center along either major meridian. Such error criteria as have been formulated to date, however, have not taken full account of the intended wearer's viewing habits for close and distant vision and, for this reason, are not entirely satisfactory. Further, the specification of zero error at the optical center often introduces an unnecessary constraint, particularly in correcting off-axis power errors.

Moreover, these previous disclosures have generally emphasized the optimization of the design of the individual lenses making up the series and have not given full consideration to optimizing the relationship between the curvatures of the respective lenses. This relationship of individual curvatures is important, however, for several reasons. First, obvious considerations of economy dictate that a lens series be generated from families of front and back curves that are as small as possible consistent with satisfactory off-axis correction.

Second, since image magnification is primarily controlled by the front curvatures, simply optimizing this curvature for each individual lens is likely to result in appreciable magnification imbalances between pairs of left and right lenses of slightly different power. In the prior art it has been common practice to optimize a front curve for a selected prescription and then use that particular front curve over a range of prescriptions, resulting in steps of one to two diopters between adjacent front curves of a series. This practice introduces magnification differences between the lenses of the two eyes when there is a slight difference in prescription that falls on a point in the series where front curves are changed. Further, this stepping system introduces compromises in the design at these borderlines between front curve selections.

Finally, the relationship between the lens curvatures is important even from the point of view of on-axis performance. Traditionally, lens grinding tools and molds for plastic lenses are ground to "standard ophthalmic curves". These curves have dioptric values in even steps of 1.00, 0.25 and sometimes 0.125 D. The problem arises in that no currently used ophthalmic optical material has an index of refraction of 1.53, for which the tools have been designed; ordinary spectacle lens glass has an index of 1.523; high-index glass has an index of 1.70. The common hard resin plastic used to make lenses has an index of approximately 1.50, and some of the newer materials have higher indices. For example, polycarbonate material has an index of approximately 1.586.

In practice, manufacturers of semi-finished blanks take into account tool index in designing the front curve of the semi-finished blank, so that the curve on the blank which is nominally +10.25 D is not exactly +10.25 D, but a curve which takes into account the fact that the concave curve has a slightly different value than the label on the tool. There is a further compensation on the front surface due to the fact that front convex surfaces gain power when referred through the thickness to the ocular surface. Thus, there are two compensations that enter into the radius of the front surface, one due to the use of standard 1.53 tools for grinding the concave surface and the other due to the thickness effect.

As a result of using the 1.53 tool index system, if one wishes to change prescription by 1.00 D by using the same given front curve while maintaining the thickness, one cannot easily do it since there are no tool steps of 1.00 D true power. At 1.00 D, this is not serious. If one wishes to change by more than 1.00 D, the errors begin to be significant. When these inherent errors are added to those normally attributed to manufacturing tolerances or inaccuracies of production methods, there is often waste in laboratories. Also, prescription errors result which may be within standard tolerances but still result in lenses which are not as accurate as they may otherwise be. This inaccuracy is particularly true in the case of astigmatic corrections where the cylinder is calibrated in the standard 1.53 curves. The result is that almost no cylinder prescription which is finished with the standard tools can have the specified value.

SUMMARY OF THE INVENTION

One of the objects of my invention is to provide an ophthalmic lens series which more precisely allows for deviation of spectacles from average fitting position.

Another object of my invention is to provide an ophthalmic lens series which more precisely allows for deviations of the straight-ahead line of sight due to changes in posture.

A further object of my invention is to provide an ophthalmic lens series which more precisely considers both near-point and distant-point seeing tasks.

Still another object of my invention is to provide an ophthalmic lens series which more precisely considers typical scanning habits.

A still further object of my invention is to provide an ophthalmic lens series which more precisely considers the eye's differential ability to accommodate for different types of errors.

Another object of my invention is to provide an ophthalmic lens series which considers off-axis errors in conjunction with errors at the optical center.

Yet another object of my invention is to provide an ophthalmic lens series which optimizes the usable lens area within accepted standard tolerances.

Another object of my invention is to provide an ophthalmic lens series which substantially minimizes magnification imbalances for anisometropic prescriptions.

A further object of my invention is to provide an ophthalmic lens series which effectively minimizes the number of front and back base curves consistent with adherence to design objectives.

Another object of my invention is to provide an ophthalmic lens series which minimizes prescription errors for lens materials having a refractive index other than 1.53.

Another object of my invention is to provide an ophthalmic lens series which is especially adapted for use of polycarbonate as the lens-forming material.

Other and further objects of my invention will be apparent from the following description.

In one aspect, my invention contemplates an ophthalmic prescription lens series in which each of the lenses has a concave rear base curve selected in such a manner as to minimize a composite error substantially equally dependent on the astigmatic error for distant points, the positive power error for distant points, half the negative power error for distant points, and the astigmatic error for a near point of approximately 40 centimeters. The errors are computed for an approximate angle of 28° between the line of sight of the wearer and the optical axis of the lens for both major meridians of the lens, for a first eye-to-lens distance measured from the nasal bevel of the lens to the center of rotation of the eye of approximately 24 millimeters, and for a second eye-to-lens distance similarly defined of approximately 34 millimeters for prescriptions between approximately +2.00 and −2.00 D and 32 millimeters for other prescriptions.

In another aspect, my invention contemplates an ophthalmic prescription lens series in which each of the lenses has a concave rear base curve selected in such a manner as to maximize the angle of the view between the line of sight of the wearer and the optical axis of the lens within which the astigmatic error for distant points, the power error for distant points, and the astigmatic error for a near point of approximately 40 centimeters are each not greater than 0.13 diopters, the errors being computed for both major meridians of the lens for an eye-to-lens distance measured from the nasal bevel of the lens to the center of rotation of the eye of approximately 29 millimeters for prescriptions between approximately +2.00 D and −2.00 D and 28 millimeters for other prescriptions.

In yet another aspect, my invention contemplates an ophthalmic lens series in which individual lenses are designed with an intentional small (0.04 to 0.10 D) power error or bias at the optical centers thereof, the direction of the bias being plus for plus lenses and minus for minus lenses. By biasing the power correction at the optical center in this manner, I am able to reduce the magnitude of off-axis power errors, which are inherently minus for plus lenses and plus for minus lenses. Since off-axis astigmatic errors are relatively unaffected by central power biasing, and since the central biasing itself is well within standard tolerances of ±0.125 D, I am able to reduce the average magnitude of refractive power errors within a given angle of view within which the errors meet a given error criterion. By taking into account the reduced off-axis power error due to central power biasing when selecting front and back curves, I am able to achieve even further reductions in the average error of lenses designed according to my method.

In a further aspect, my invention contemplates an ophthalmic lens series, the lenses of which have spherically curved front surfaces of different predetermined surface curvatures selected from a family of front curvatures differing in nominal power by steps of 0.25 D, and have finished prescriptive rear surfaces thereon whose base curvatures are selected from a family of concave curvatures differing by steps of 0.50 D.

In yet another aspect, my invention contemplates an ophthalmic lens series with prescriptive rear surfaces in which the true-power curvatures of each of said surfaces along the sphere and cylinder meridians thereof differ from each other and from the corresponding curvatures of other lenses of the series by integral multiples of a selected dioptric fraction, preferably 0.25 D. Thus, hard resin tools are ground with radii based on the assumption of the index of refraction of the resin, namely 1.50. When we are discussing polycarbonate having an index of 1.586, the tool radii and cylinder radii are based on the index of 1.586. That is, the ocular curves have true-power tools and are labeled in their true power, both for the spherical and cylindrical meridians. The advantage of this is immediately evident, since all of the cylinder values will be correct. The only error resulting is any production error in cutting or manufacturing of the tool or the mold.

For minus and zero sphere power lenses, true-power concave tools provide not only great design flexibility, but also perfect prescription accuracy since these lenses can be made with a constant thickness. If, in addition, one forms the various lenses of the series from a set of front curves stepped by 0.25 and a set of concave curves stepped by 0.50 D, with zones of constant concave curves rather than constant front curves, a set of very accurate prescriptions from the low plus area far into the minus area can be achieved with far fewer tools than if the fronts had to be changed because of the fact that the index tools of the back were not correct. Again, the cylinder meridians would be correct only in this new system.

In the plus prescription area, there exists the additional problem that the thickness of the lenses changes with the plus spherical value. Thus, a single front curve does not serve well for a variety of prescriptions because the thickness changes. However, this effect is reduced and the production is less complicated if true-power curves are used for the concave surface.

BRIEF DESCRIPTION OF THE DRAWINGS

In the accompanying drawings to which reference is made in the instant specification and in which like reference characters are used to indicate like parts in the various views:

FIG. 1 is a left side elevation of a typical well-fitted pair of spectacles on the face of the wearer.

FIG. 2 is a section taken along line 2—2 of FIG. 7 showing the relationship between the straight-ahead line of sight and the optical axis of the lens.

FIG. 3 is a front elevation of a right spectacle lens showing a typical vertical range of intersections of the straight-ahead line of sight and the lens front surface.

FIG. 4 is a front elevation of a right spectacle lens showing a typical circular range of intersections of the straight-ahead line of sight and the lens front surface.

FIG. 5 is a front elevation of a right spectacle lens showing typical distant-point scanning ellipses centered about the points shown in FIG. 4.

FIG. 6 is a front elevation of a right spectacle lens showing a typical near-point scanning center of the lens and the associated near-point scanning ellipse.

FIG. 7 is a section taken along line 7—7 of FIG. 2 showing the anatomical and mechanical variables that affect the center-of-rotation distance.

FIG. 8 is a graph of the field of view as a function of concave base curve for various central power compensations.

FIG. 9 is a graph of the field of view as a function of sphere prescription for various central power compensations.

FIG. 10 is a graph of the field of view as a function of the concave base curve for various indices of refraction of a plus lens.

FIG. 11 is a graph of the field of view as a function of the concave base curve for various indices of refraction of a minus lens.

FIG. 12 is a graph of the optimum base curve as a function of sphere prescription for various indices of refraction.

DETAILED DESCRIPTION OF THE PREFERRED EMBODIMENTS

The design of an ophthalmic lens requires certain assumptions to be made regarding the location of the lens in front of the eye and how the lens will be used. These include the vertex distance, vertical centering, and the angle of view with respect to the optical axis, including the pantoscopic angle. The geometry that relates the fitting of spectacles to the anatomical location of the sighting center of the eye is thoroughly discussed in the literature. Such literature includes, for example, E. W. Bechtold, "The Aberrations of Ophthalmic Lenses," *Am. J. Optom. & Arch. Am. Acad. Optom.* 35(1):10–24(1958); G. A. Fry & W. W. Hill, "The Center of Rotation of the Eye," *Am. J. Optom. & Arch. Am. Acad. Optom.* 39(11):581–595(1962); J. K. Davis, H. G. Fernald & A. W. Rayner, "The Design of A General Purpose Single Vision Lens Series," *Am. J. Optom. & Arch. Am. Acad. Optom.* 42(4):203–236(1965); and B. Grolman, "The Sighting Center," *Am. J. Optom. & Arch. Am. Acad. Optom.* 40(11):666–675(1963). The types of errors designers attempt to correct, the degree of success achieved, and the significance of base curve, fitting distance, and object distance are also discussed.

Most previous lens series have been designed for a specified angle of view or for a series of angles—30° and 40° for weak prescriptions and 20° for strong prescriptions. I take a slightly different approach in designing the lenses which make up the series of lenses which are the subject matter of my invention.

I assume that the typical well-fitted spectacle will be fitted as shown in FIGS. 1 and 2, and that the average straight-ahead line of sight 10, which is parallel with the temples, intersects the front surface of the lens 12 at a point 16 spaced 5 mm above the optical center OC. This point 16 would be a patient's "zero" position about which he would scan a fairly small field of view. In addition, I assume a frequent deviation from the point 16, due to variations in individual posture or head orientation, so that the locus of typical "zero angle" viewing positions 20 lies within a circle 18 which is 10 mm in diameter and which is centered at the point 16 as shown in FIGS. 3 and 4.

I further assume that for frequent scanning of the field of view without head movement a typical wearer scans an elliptical field of view which is 20° vertical by 30° horizontal, or 10° by 15° for half fields of view, as measured from the center of rotation CR of the eye 14. This analysis leads me to conclude that the lens 12 should be corrected so that errors are minimized for a family of ellipses 22 as shown in FIG. 5, each ellipse 22 having a major (horizontal) axis dimension of about 15 mm and a minor (vertical) axis dimension of about 10 mm. Or, stated somewhat differently, the lens 12 should be corrected so as to minimize errors inside an envelope ellipse 24 which includes all of the individual ellipses 22 for the various points 20 and which extends about 10 mm vertically and 12.5 mm horizontally from point 16.

For near-point tasks the location of the ellipse can be determined by the location of bifocal segments. Most are placed with their geometric centers approximately 11 mm down and 2 mm in (toward the nose) from the optical center OC. We thus can describe a near-point ellipse 26 centered about a near-point center NPC (FIG. 6) such that its location and width provide the same area of view without head motion as a 25 mm bifocal segment. Or we can assume it is desirable to scan a 7-inch-long scale or the page of a book at 13 inches.

Assumptions such as these combined with various assumptions regarding the fitting of the lens result in ellipses of various sizes. The angle subtended at the optical axis OA of the lens by the nasal edge of the ellipses 24 and 26 ranges from 25° to 30°. I select 28° as the angle of view to be used for both the distance and near-point design. I illustrate these seeing tasks with the ellipses 24 and 26 as shown in FIGS. 5 and 6 in order to point out that conservative physiological scans of only plus or minus 15° laterally require much larger angles of view than 15° with respect to the optical axis of the lens. Thus performance data for a geometric angle of 25° to 30° apply to physiological angles of 13° to 15°.

FIG. 7 shows some of the anatomical and mechanical variables affecting the center-of-rotation distance. In this figure, the nasal eyewire distance NEW represents the distance between the corneal plane 28 and the apex of the bevel portion of lens 12 received by the inner, or nasal, frame portion 32. The temporal eyewire distance TEW represents the corresponding measurement taken at the outer, or temporal, frame portion 30. The geometric center GC of the lens 12 is the point equidistant from the temporal and nasal frame portions 30 and 32, and is generally spaced outwardly somewhat from the optical center OC. Because of this asymmetry of cutting about the axis OA of optical symmetry, the temporal eyewire distance TEW is slightly less than the nasal eyewire distance NEW.

The optical "stop" or center-of-rotation distance is defined as the sum of the vertex distance VD, or distance between the ocular vertex of lens 12 and the corneal plane 28 of the eye 14, and the sighting-center distance SCD, or distance between the corneal plane 28 and the center of rotation of the eye 14. If we assume a fixed frame position, the center-of-rotation distance is dependent on sighting-center distance, average eyewire distance, front bevel width, depth of curve of the front surface, and thickness of the lens.

Fry and Hill and Grolman, in the above-cited references, have shown that the sighting-center distance SCD is variable over narrow limits, varies with the axial ametropia, and is longer for lateral eye movements and shorter for vertical ones. From a study of these references and since both distance and near seeing tasks involve oblique angles of view, values of 14.25 and 13.25 mm were chosen for distance and near-point calculations respectively. These distances were modified by −0.14 mm/D of average sphere power.

A well-fitted plastic frame locates the apex of the nasal bevel in line with the inset of the nose, which inset is the closest approach of the nose to the plane of the cornea. Metal frames often place the bevel even closer to the plane of the cornea but there is a considerable variation in its location.

It has been shown that the average inset-to-cornea, or nasal eyewire, distance is 13.6 mm. I select this value as the average nasal eyewire distance NEW. However, I use a range to provide for a range of fitting distances, nose sizes, and frame styles. This range is from 9.6 to 17.6 mm for prescriptions over ±2.00 D total power and from 9.6 to 19.6 mm for weaker prescriptions.

The front bevel width 34 depends on the prescription and the edging technique. It is larger on industrial safety lenses than on dress lenses. The assumed values ranged from 1.4 to 1.8 mm, 1.4 mm being assumed for plus lenses and 1.8 mm being assumed for minus lenses. The depth of curve of the front surface obviously depends on the dioptric value of the curve and nasal semidiameter. The nasal semidiameter, which is the distance between the apex of the nasal bevel and the optical axis OA, is taken as 21.5 mm. The effect of depth of curve is included in the calculations. The thickness varies with prescription and maximum lens diameter. The ANSI Z87 specifications for thickness at center and edge are met for a finished diameter of 68 mm at the beginning of the bevel (70 mm uncut size).

These assumptions and the resulting range of cornea-to-lens (vertex) distances are summarized in Table 1 below:

TABLE 1

| Dimension | Assumed Value (mm) |
|---|---|
| Sighting-center dist. | |
| Distance | 14.25 |
| Near | 13.25 |
| Eyewire distance | |
| > ±2.00 D | 9.6–17.6 |
| Other powers | 9.6–19.6 |
| Front-bevel width | 1.4–1.8 |
| Nasal semidiameter | 21.5 |
| Minimum center thick. | 3.2 |
| Minimum edge thick. | |
| > +2.50 D | 2.7 |
| Other powers | 3.2 |
| Resulting approx. vertex dist. | |
| +4.00 DS | 8–16 |
| Plano | 10–20 |
| −6.00 DS | 10–18 |

Since small changes in fitting position and small changes in thickness of a millimeter or two do not greatly affect optical performance, the data above are not considered restrictive but only illustrative of the procedure used to position the lens in front of the eyes for pertinent calculation purposes.

Having established the geometry, I now consider the design philosophy and what criteria should be used for base curve selection. Since all lenses have errors for off-axis viewing positions and since they cannot be corrected simultaneously, a decision regarding the compromise or balance is necessary. This lens series is intended as an ophthalmic prescription, industrial protective lens series. For this reason, comfort and acuity for near-point seeing tasks is important. On the other hand, the wearers are likely to be driving at night or on construction work out-of-doors, where far-point seeing tasks are prevalent. Awkward overhead viewing tasks indicate a need for good correction for both near and distant tasks in the upper portion of the field of view.

Since the angles of view to be corrected are derived from an assumption of frequent and relatively prolonged use of off-axis areas, it is logical to assume the ability to accommodate for decimal amounts of negative prescription error for distant tasks. This is not true for plus errors. Near-point power errors are always present and can be adapted for by head movement or accommodation, just as they are with plano lenses or without lenses. Oblique astigmatism, however, should be corrected. Thus, for this lens series near-point tasks receive a priority essentially equal to distant-point tasks. Plus meridional power errors and astigmatism for an infinite object distance are weighted equally with astigmatism for a near point of 40 cm, or about 16 inches. Negative power errors for infinity are weighted by 50%. However, these almost never were the deciding criteria.

With finite steps in base curves it is rare that two errors can be of identical value. One must decide whether to slightly favor one error or another. For such decisions the weighting is in this order: distance astigmatism, distance power error, and near astigmatism. Power errors are subordinate slightly because with the precision of the manufacture which is available the central spherical power can be slightly biased to partially offset the power error in off-center areas. This bias of 0.04 to 0.10 D enables a more precise balance of the astigmatism and power errors and increases the useful area of the lens from the center outward within which standard tolerances for the center are maintained. For weak prescriptions, however, changes in curve are not made where the difference in 28° performance is a matter of 0.01 D or so, thus minimizing magnification differences rather than adhering inconsequentially to the off-axis design philosophy.

A discussion of error balancing, to be meaningful, requires a representative display of numerical information. Table 2 lists the power and astigmatic errors at the 28° off-axis points on the principal meridians (point A lies on the meridian of spherical power, point B on the power meridian of the cylinder) of a −2.00 DS ( ) −1.50 DC polycarbonate lens ($N_D$=1.586) at various fitting distances and for various choices of true-power rear base curve. (The notation "−2.00 DS ( ) −1.50 DC" refers to a lens having a −2.00 D sphere combined with −1.50 D cylinder.) Each indicated fitting distance is the center-of-rotation distance for that column of data. In the body of the table parentheses indicate errors in excess of the maximum found in the best column (−7.25 D base curve). A study of this table in view of the design priorities stated above indicates that the curve of choice is −7.25 D. All other curves yield larger errors and the balance of power and astigmatism is not maintained.

TABLE 2

| | Off-Axis Power Errors (D) for Base Curves (D): | | | | |
|---|---|---|---|---|---|
| | −6.25 | −6.75 | −7.25 | −7.75 | −8.25 |
| Short fitting dist (mm) | 24.7 | 24.9 | 25.1 | 25.3 | 25.5 |
| At point A: | | | | | |
| Sph. merid. error | −0.18 | −0.15 | −0.11 | −0.08 | −0.06 |
| Cyl. merid. error | −0.04 | −0.03 | −0.02 | 0.00 | 0.01 |
| Astigmatic error | 0.14 | 0.12 | 0.09 | 0.08 | 0.07 |
| Near astig. error | 0.10 | 0.08 | 0.07 | 0.05 | 0.04 |
| At point B: | | | | | |

TABLE 2-continued

| | Off-Axis Power Errors (D) for Base Curves (D): | | | | |
|---|---|---|---|---|---|
| | −6.25 | −6.75 | −7.25 | −7.75 | −8.25 |
| Sph. merid. error | 0.09 | 0.10 | 0.12 | 0.13 | 0.15 |
| Cyl. merid. error | −0.18 | −0.12 | −0.07 | −0.02 | 0.03 |
| Astigmatic error | (−0.27) | (−0.23) | −0.19 | −0.15 | −0.12 |
| Near astig. error | −0.15 | −0.11 | −0.08 | −0.05 | −0.03 |
| Long fitting dist (mm) | 32.7 | 32.9 | 33.1 | 33.3 | 33.5 |
| At point A: | | | | | |
| Sph. merid. error | −0.06 | −0.02 | 0.01 | 0.04 | 0.06 |
| Cyl. merid. error | 0.01 | −0.03 | 0.04 | 0.05 | 0.06 |
| Astigmatic error | 0.07 | 0.05 | 0.03 | 0.01 | 0.00 |
| Near astig. error | 0.01 | −0.01 | −0.02 | −0.03 | −0.04 |
| At point B: | | | | | |
| Sph. merid. error | 0.15 | 0.17 | 0.18 | (0.20) | (0.22) |
| Cyl. merid. error | 0.04 | 0.09 | 0.14 | 0.19 | (0.22) |
| Astigmatic error | −0.11 | −0.08 | −0.04 | −0.01 | 0.00 |
| Near astig. error | 0.04 | 0.07 | 0.09 | 0.11 | 0.13 |

While the sheer volume of data makes it difficult to summarize my findings in a concise manner and justify my approach for all powers of lenses, I have abstracted what I believe to be representative sample of my findings in the following tables. Table 3 lists for spherical polycarbonate ($N_D = 1.586$) lenses the greatest error—that is, the error that contributed to the decision for the long and short fitting distances for each spherical step of the series—together with the rear base curve as measured with a "lens clock" that assumes a refractive index of 1.53. In the table, DA signifies distant-object astigmatism, NA near-object (40 cm) astigmatism, and DP distance dioptric power error for the meridian of greatest error. Table 4 gives similar data for toric prescriptions of minus −2.00 D cylinder value, and Table 5 for toric prescriptions of −3.00 D cylinder value.

These tables show that for typical seeing positions, even a very carefully designed lens has significant departures from the prescription. If one grants that the 8 and 10 mm ranges of fitting distances are not extreme, it becomes clear that for lenses which are not well fitted so that the eye is located near the optical axis, as well as for lenses farther from the eye than assumed, the errors will be greater. Further, any errors at the optical center will be added algebraically to the errors given in the tables.

TABLE 3

| Sphere Power (D) | Greatest Power Error (D) at Fitting Distance: | | Base Curve (D) |
|---|---|---|---|
| | Short | Long | |
| +4.00 | 0.14 DA | 0.13 NA | −5.65 |
| +3.00 | 0.10 DA | 0.13 NA | −5.65 |
| +2.00 | 0.08 DA | 0.10 NA | −5.30 |
| +1.00 | 0.04 NA | 0.08 NA | −5.20 |
| 0.00 | 0.06 NA | 0.05 NA | −6.11 |
| −1.00 | 0.07 DA | 0.03 DP | −7.46 |
| −2.00 | 0.09 DA | 0.09 DP | −7.46 |
| −3.00 | 0.12 DA | 0.13 DP | −7.91 |
| −4.00 | 0.17 DA | 0.15 DP | −7.91 |
| −5.00 | 0.21 DA | 0.19 NA | −8.37 |
| −6.00 | 0.22 DA | 0.27 NA | −8.82 |

TABLE 4

| Sphere Power (D) | Greatest Power Error (D) at Fitting Distance: | | Base Curve (D) |
|---|---|---|---|
| | Short | Long | |
| +4.00 | 0.25 DA | 0.28 NA | −5.65 |
| +3.00 | 0.23 NA | 0.22 NA | −5.65 |
| +2.00 | 0.20 NA | 0.16 NA | −5.65 |

TABLE 4-continued

| Sphere Power (D) | Greatest Power Error (D) at Fitting Distance: | | Base Curve (D) |
|---|---|---|---|
| | Short | Long | |
| +1.00 | 0.17 DA | 0.11 DA | −6.11 |
| 0.00 | 0.17 DA | 0.16 DP | −6.11 |
| −1.00 | 0.17 DA | 0.20 DP | −6.56 |
| −2.00 | 0.19 DA | 0.23 DP | −6.56 |
| −3.00 | 0.21 DA | 0.27 DP | −7.01 |
| −4.00 | 0.28 DA | 0.27 DP | −7.01 |
| −5.00 | 0.30 DA | 0.29 DP, NA | −7.46 |
| −6.00 | 0.36 DA | 0.35 NA | −7.91 |

TABLE 5

| Sphere Power (D) | Greatest Power Error (D) at Fitting Distance: | | Base Curve (D) |
|---|---|---|---|
| | Short | Long | |
| +2.00 | 0.23 DA, NA | 0.17 DA | −6.11 |
| +1.00 | 0.21 DA | 0.19 DP | −6.11 |
| 0.00 | 0.18 DA | 0.24 DP | −6.11 |
| −1.00 | 0.20 DA | 0.27 DP | −6.11 |
| −2.00 | 0.25 DA | 0.29 DP | −6.11 |

Since lens designers must decide on their particular error balance and since the resulting errors are frequently outside accepted tolerances of prescription accuracy, it is desirable to present the performance of a lens series in more conventional terms if possible. Prescription tolerances for the center of the lens as specified in ANSI Z80.1 1979 are 0.13 D for sphere power and cylindrical power. Table 6 gives the diameter of a circle within which there is no meridional power error greater than 0.13 D for distance seeing and no astigmatic error greater than 0.13 D for either distance or near point (40 cm) tasks for selected lenses of the polycarbonate series designed in accordance with the above criteria. A 20-mm-diameter circle subtends a field angle of about 40°. With Tables 2 through 6, one can easily determine what errors are likely to be found in lenses he prescribed, both in terms of the greatest error at a pertinent area intermediate between the center and the edge and, further, over what area errors are less than standard tolerances.

TABLE 6

| Sphere Power (D) | Diameter of Circle on Lens (mm) | | | |
|---|---|---|---|---|
| | No cyl at fitting distance: | | −2 DC at fitting distance: | |
| | Short | Long | Short | Long |
| +4.00 | 24 | 28 | 19 | 23 |
| +3.00 | 30 | 32 | 22 | 25 |
| +2.00 | 37 | 39 | 23 | 31 |
| +1.00 | 40 | 46 | 24 | 38 |
| 0.00 | 39 | 73 | 24 | 33 |
| −1.00 | 44 | 73 | 24 | 29 |
| −2.00 | 33 | 45 | 21 | 26 |
| −3.00 | 31 | 36 | 21 | 26 |
| −4.00 | 23 | 32 | 18 | 26 |
| −6.00 | 19 | 32 | 16 | 23 |

The use of lens diameter or field of view in the object space that is within tolerance as a criterion for base-curve selection follows the thought that such data can be used to express lens quality. To provide a maximum field of view that is within standard tolerances, assuming either no error or a specified offset error at the lens center, is a valid and simple theoretical design goal. In order to provide some latitude for choice of base curve and for variations in eye position or other parameters, selection of base-curve values so as to provide a field of view within 20% of the maximum field of view within standard tolerances is a practical compromise.

Tables 7 and 8 give 1.53 concave base curve ranges by sphere and cylinder prescription power that will provide the maximum field of view within a tolerance of 0.13 D of sphere or cylinder error for an average eye position. In each block of data, the central figure is the curve yielding the maximum field, while the upper and lower figures are those base-curve values for which the fields of view within tolerances are smaller than the maximum field of view by 20%. In some cases, there is no practical limit on base-curve value, as shown by "I" (insensitive) or by "greater than" or "less than" signs. Central power compensations of −0.04 and −0.04 D were assumed in the calculations for plus prescriptions and minus prescriptions respectively. These tables constitute a design statement and the invention of a lens series that maximizes the useful field of view for an average eye position.

TABLE 7

| Sphere | 0.00 cyl | −1.00 cyl | −2.00 cyl | −3.00 cyl |
|---|---|---|---|---|
| −1.00 |  | 6.00 | 5.00 | 4.75 |
|  |  | 7.00 | 6.25 | 5.50 |
|  |  | >9.00 | >8.00 | 8.00 |
| −2.00 | 6.50 | 6.25 | 5.50 | 5.25 |
|  | 7.00 | 7.25 | 6.75 | 6.00 |
|  | 10.00 | >9.00 | 8.75 | 8.00 |
| −3.00 | 7.00 | 6.75 | 6.00 | 5.75 |
|  | 7.50 | 7.50 | 6.50 | 6.50 |
|  | 9.50 | 9.50 | 8.50 | 8.50 |
| −4.00 | 7.25 | 7.00 | 6.50 | 6.50 |
|  | 8.00 | 7.50 | 7.00 | 7.00 |
|  | 9.50 | 9.50 | 9.25 | 8.50 |
| −5.00 | 7.75 | 7.50 | 7.25 | 7.25 |
|  | 8.50 | 8.50 | 7.75 | 7.50 |
|  | 9.75 | 10.00 | 10.25 | 9.25 |
| −6.00 | 8.25 | 8.00 | 7.75 | 7.50 |
|  | 8.75 | 8.50 | 8.25 | 8.00 |
|  | 10.00 | 10.50 | 10.50 | 10.00 |

TABLE 8

| Sphere | 0.00 cyl | −1.00 cyl | −2.00 cyl | −3.00 cyl |
|---|---|---|---|---|
| +6.00 | 4.75 | 5.50 | 5.25 | −5.00 |
|  | 5.50 | 6.50 | 7.00 | 6.25 |
|  | 7.50 | 8.00 | >8.50 | >9.00 |
| +5.00 | 4.50 | 5.25 | 5.25 | 4.50 |
|  | 5.50 | 6.00 | 6.00 | 6.25 |
|  | 7.50 | 7.50 | 8.25 | >9.00 |
| +4.00 | 4.50 | 5.25 | 4.75 | 4.50 |
|  | 5.50 | 6.00 | 6.00 | 5.75 |
|  | 7.50 | 7.00 | 8.25 | >9.00 |
| +3.00 | 4.50 | 5.00 | 4.50 | 4.25 |
|  | 5.25 | 5.50 | 5.75 | 5.75 |
|  | 6.50 | 6.50 | >7.50 | >9.00 |
| +2.00 | 4.25 | 4.50 | 4.50 | 4.00 |
|  | 5.00 | 5.50 | 5.50 | 6.50 |
|  | 6.25 | 7.50 | >7.00 | 9.00 |
| +1.00 | 4.25 | 3.50 | 3.25 | <3.00 |
|  | 4.50 | 5.25 | 6.00 | 4.25 |
|  | >6.50 | >8.00 |  | 9.00 |
| 0.00 | I |  | 4.50 | 3.50 | <3.50 |
|  |  | 6.50 | 5.25 | 4.50 |
|  |  | >8.50 | >7.00 | 7.25 |

As mentioned above, control of optical center performance is precise and repeatable. It enables the expansion of the central tolerances from a point to an area by biasing the center error opposite to the inherent off-center errors, which are negative for plus and positive for minus prescriptions. This bias is an important factor in the invention and is novel in the art. The advantages gained by it are outlined in the following discussion and illustrative figures, which describe the balancing-of-error process as applied to the 28° points of the principal lens meridians.

Referring to Table 9, which lists off-axis errors for 28° for a prescription of +3.00 sphere, it can be seen that for the range of sighting-center distances—that is, the long and short eye positions—an excellent choice of curvature would be the −6.25 D base. This is a true-power curve. If one examines the errors for the short eye position, one will see that the sphere, cylinder and astigmatic errors are all 0.11 D or less. While the sphere and cylinder meridians have errors of 0.15 D for the long eye position, these are negative and probably would be partially accommodated for. However, the astigmatism for a near object is 0.13 D. The choice of curve is arrived at by virtue of the fact that if a steeper curve is used, the near-point astigmatism increases so that it is the most serious error; on the other hand, if the curve is flattened to −5.75 D, the near-point astigmatism improves, but the astigmatism for a short eye position increases to 0.13 D. In cases such as this, the previously stated criteria dictate that the advantage be given to distance astigmatism. This is because for prolonged driving, for example, the comfort and vision of the wearer are very important and driving postures are quite rigid. On the other hand, for near-point tasks such as reading, posturing to avoid discomfort is easier.

TABLE 9

|  | Off-Axis Power Errors (D) for Base Curves (D): | | | | | |
|---|---|---|---|---|---|---|
|  | −5.25 | −5.75 | −6.25 | −6.75 | −7.25 | −7.75 |
| Short fitting dist (mm) | 22.2 | 22.3 | 22.4 | 22.6 | 22.7 | 22.8 |
| At point A: |  |  |  |  |  |  |
| Sph. merid. error | 0.10 | 0.04 | −0.02 | −0.07 | −0.12 | −0.17 |
| Cyl. merid. error | −0.07 | −0.09 | −0.11 | −0.13 | −0.15 | −0.16 |
| Astigmatic error | −0.18 | −0.13 | −0.10 | −0.06 | −0.03 | 0.01 |
| Near astig. error | −0.04 | 0.00 | 0.04 | 0.07 | 0.10 | 0.13 |
| At point B: |  |  |  |  |  |  |
| Sph. merid. error | −0.07 | −0.09 | −0.11 | −0.13 | −0.15 | −0.16 |
| Cyl. merid. error | 0.10 | 0.04 | −0.02 | −0.07 | −0.12 | −0.17 |
| Astigmatic error | 0.18 | 0.13 | 0.10 | 0.06 | 0.03 | −0.01 |
| Near astig. error | 0.04 | −0.00 | −0.04 | −0.07 | −0.10 | −0.13 |
| Long fitting dist (mm) | 30.2 | 30.3 | 30.4 | 30.6 | 30.7 | 30.8 |
| At point A: |  |  |  |  |  |  |
| Sph. merid. error | −0.05 | −0.10 | −0.15 | −0.19 | −0.23 | −0.26 |
| Cyl. merid. error | −0.12 | −0.14 | −0.15 | −0.17 | −0.18 | −0.19 |
| Astigmatic error | −0.07 | −0.04 | −0.00 | 0.03 | 0.05 | 0.07 |
| Near astig. error | 0.07 | 0.10 | 0.13 | 0.15 | 0.17 | 0.18 |

TABLE 9-continued

|  | Off-Axis Power Errors (D) for Base Curves (D): | | | | | |
|---|---|---|---|---|---|---|
|  | −5.25 | −5.75 | −6.25 | −6.75 | −7.25 | −7.75 |
| At point B: | | | | | | |
| Sph. merid. error | −0.12 | −0.14 | −0.15 | −0.17 | −0.18 | −0.19 |
| Cyl. merid. error | −0.05 | −0.10 | −0.15 | −0.19 | −0.23 | −0.26 |
| Astigmatic error | 0.07 | 0.04 | 0.00 | −0.03 | −0.05 | −0.07 |
| Near astig. error | −0.07 | −0.10 | −0.13 | −0.15 | −0.17 | −0.18 |
| (Tot. wtd. square err.)$^{\frac{1}{2}}$ | 0.34 | 0.29 | 0.29 | 0.33 | 0.38 | 0.44 |

However, if the central power of the lens is biased by the factory or laboratory slightly plus—for example, between 0.04 and 0.10 D—the meridional power errors for 28° would be reduced accordingly without in any way altering the astigmatism. Thus the lens would behave better and the patient would have more nearly the required prescription at the 28° point. The determining criteria, distance and near astigmatism, would be the same. Thus if we were using as a criterion the maximum size of the field of view that is within a specified tolerance—for example, 0.13 D—the choice of base curves and the resulting field of view would be unchanged by compensating the central power. However, the performance of the lens throughout the field of view would be improved.

For minus prescriptions the effect of compensating the central power not only improves the performance at a specific field of view such as 28° angle on the ocular side of the lens but actually increases the size of the field of view within which all errors are within tolerance for selected base curve ranges. Referring to Table 10, which is for a −1.00 D sphere with a −2.00 D cylinder and 28° ocular angle of view, the base curve selected by balancing the above error criteria is −7.25 D. This is selected because for the short eye position, the astigmatic error at Point B of the toric is approximately equal to the sphere meridian error in the long eye position at point B of the toric. It can be seen that if we make the curve shallower or steeper, either the astigmatism for the short eye position or the power in the sphere meridian of the long eye position deteriorates.

However, if we now assume that the central power compensated negatively with a value between 0.04 and 0.10 D, the meridional power errors for both the short and long eye positions at point B of the toric would be improved without bringing the same errors at point A of the toric to as great a value as the uncompensated errors at point B. Thus, not only is the performance of the lens improved at the 28° point, but since the meridional power errors are the determining factor, the useful field of view within a given tolerance is improved. This allows a choice of base curve which is slightly steeper than one would choose if there were no compensation, thus reducing the astigmatism. Since the power error is reduced by the compensation, the astigmatism and power errors would have a desired balance.

This concept is further illustrated by referring to FIG. 8, which is a graph of field of view as a function of true-power concave base curve of a −3.00 DS industrial thickness polycarbonate ($N_D$=1.586) lens with and without a central power compensation of −0.04 D. In this graph the field of view is expressed in terms of a number 100 times the tangent of the half-angle of view in the object space—in other words, the radius in feet of the circle of view at an object distance of 100 feet. On this graph it can be seen, as discussed above, that a compensation of −0.04 improves the field of view for a wide range of base curves for the long eye position without significantly altering the field of view for the short eye position at the compromise design point of a −8.75 D base curve. This is because power errors control at the long eye position and astigmatism errors control at the short eye position on minus lenses. The long eye position thus gains without the short eye position losing. The choice of curve is slightly steeper in this case as a result of compensation.

TABLE 10

|  | Off-Axis Power Errors (D) for Base Curves (D): | | | | |
|---|---|---|---|---|---|
|  | −6.25 | −6.75 | −7.25 | −7.75 | −8.25 |
| Short fitting dist (mm) | 24.40 | 24.60 | 24.80 | 25.00 | 25.20 |
| At point A: | | | | | |
| Sph. merid. error | −0.105 | −0.092 | −0.080 | −0.070 | −0.060 |
| Cyl. merid. error | −0.068 | −0.060 | −0.053 | −0.046 | −0.040 |
| Astigmatic error | 0.037 | 0.032 | 0.027 | 0.024 | 0.021 |
| Near astig. error | 0.044 | 0.041 | 0.038 | 0.036 | 0.035 |
| At point B: | | | | | |
| Sph. merid. error | 0.116 | 0.128 | 0.140 | 0.152 | 0.163 |
| Cyl. merid. error | −0.111 | −0.067 | −0.027 | 0.009 | 0.043 |
| Astigmatic error | −0.227 | −0.196 | −0.168 | −0.142 | −0.120 |
| Near astig. error | −0.132 | −0.106 | −0.083 | −0.063 | −0.044 |
| Long fitting dist (mm) | 32.40 | 32.60 | 32.80 | 33.00 | 33.20 |
| At point A: | | | | | |
| Sph. merid. error | −0.039 | −0.026 | −0.014 | −0.004 | 0.005 |
| Cyl. merid. error | −0.027 | −0.019 | −0.011 | −0.005 | 0.001 |
| Astigmatic error | 0.012 | 0.007 | 0.003 | −0.001 | −0.003 |
| Near astig. error | 0.013 | 0.010 | 0.007 | 0.005 | 0.003 |
| At point B: | | | | | |
| Sph. merid. error | 0.169 | 0.184 | 0.197 | 0.211 | 0.223 |
| Cyl. merid. error | 0.077 | 0.117 | 0.151 | 0.181 | 0.206 |
| Astigmatic error | −0.092 | −0.067 | −0.046 | −0.029 | −0.017 |
| Near astig. error | 0.030 | 0.047 | 0.061 | 0.071 | 0.077 |

In the graph of FIG. 9, the same effect as discussed above is summarized for an average fitting position for a range of prescriptions all having −1.00 D cylinders. The dot-dash curve gives the maximum field obtainable with the optimum base curve with no compensation. The broken-line curve gives similar data for a compensation for ±0.04 D, plus compensation for plus lenses and minus compensation for minus lenses. The solid-line curve gives similar data of ±0.10 D. Such a large compensation, while detrimental for weak lenses because of the small inherent errors, is beneficial for significant negative prescriptions, as shown by the figure.

The concept of compensation or balancing spherical errors is sound because, with the way lenses are usually fitted, most people use for their zero position of gaze off-center areas of the lens. In other words, the line of sight most frequently used intersects the lens several millimeters from the optical center. Improving the areas of most frequent use by permitting a slight compensating error at the less used optical center is far more desirable than providing a precise prescription at the optical center and permitting residual errors to alter the prescription for areas of most frequent use.

In an array of errors such as are displayed in Tables 2, 9 and 10, it will be noted that some errors are large and significant where others are small and insignificant. A simple average of all these errors might mask one or two significant errors. However, if each error is squared (first halving negative errors) and then summed and the square root taken, a single figure of inverse merit is obtained. This figure of inverse merit is shown at the bottom of each column of Table 9. Table 11, which also lists this square error figure, is analogous to Table 9, but is for a +3.00 DS ( ) −2.00 DC lens. In Table 11, the −6.25 D base curve which has the minimum total weighted square error, is the same base curve as would be selected by inspecting all the values as was done with Tables 2, 9 and 10. Thus a lens series where the base curves are such as to minimize this figure of merit is another aspect of this invention. A table of such curves would differ only slightly from a table devised by the more complex method.

TABLE 11

| | Off-Axis Power Errors (D) for Base Curves (D): | | | | | |
|---|---|---|---|---|---|---|
| | −5.25 | −5.75 | −6.25 | −6.75 | −7.25 | −7.75 |
| Short fitting dist (mm) | 22.8 | 22.4 | 22.6 | 22.7 | 22.8 | 23.0 |
| At point A: | | | | | | |
| Sph. merid. error | 0.10 | 0.04 | −0.02 | −0.07 | −0.13 | −0.17 |
| Cyl. merid. error | −0.19 | −0.20 | −0.21 | −0.23 | −0.24 | −0.25 |
| Astigmatic error | −0.29 | −0.24 | −0.20 | −0.15 | −0.11 | −0.08 |
| Near astig. error | −0.13 | −0.08 | −0.04 | −0.00 | 0.03 | 0.07 |
| At point B: | | | | | | |
| Sph. merid. error | 0.04 | 0.02 | 0.01 | −0.00 | −0.01 | −0.02 |
| Cyl. merid. error | −0.11 | −0.13 | −0.16 | −0.18 | −0.21 | −0.23 |
| Astigmatic error | −0.14 | −0.16 | −0.17 | −0.18 | −0.20 | −0.21 |
| Near astig. error | −0.20 | −0.21 | −0.23 | −0.24 | −0.25 | −0.27 |
| Long fitting dist (mm) | 30.3 | 30.4 | 30.6 | 30.7 | 30.8 | 31.0 |
| At point A: | | | | | | |
| Sph. merid. error | −0.05 | −0.10 | −0.15 | −0.19 | −0.23 | −0.26 |
| Cyl. merid. error | −0.22 | −0.23 | −0.24 | −0.25 | −0.26 | −0.26 |
| Astigmatic error | −0.17 | −0.13 | −0.09 | −0.05 | −0.02 | 0.00 |
| Near astig. error | 0.00 | 0.04 | 0.07 | 0.10 | 0.12 | 0.14 |
| At point B: | | | | | | |
| Sph. merid. error | 0.02 | 0.01 | −0.00 | −0.01 | −0.01 | −0.02 |
| Cyl. merid. error | −0.14 | −0.16 | −0.18 | −0.20 | −0.21 | −0.22 |
| Astigmatic error | −0.16 | −0.17 | −0.18 | −0.19 | −0.20 | −0.20 |
| Near astig. error | −0.21 | −0.22 | −0.22 | −0.23 | −0.24 | −0.24 |
| (Tot. wtd. square err.)$^{\frac{1}{2}}$ | 0.54 | 0.52 | 0.51 | 0.52 | 0.55 | 0.57 |

Thickness variations have very little effect on off-axis field-of-view performance. For a given concave base curve the front curvature may be changed to provide a more nearly correct prescription at the optical center, compensating for the change in thickness. However, the difference in prescription due to a changed thickness between the optical center and an off-axis viewing point is not significant. Table 12 compares industrial thickness lenses with dress thickness polycarbonate lenses ($N_D = 1.586$) for two prescriptions for base curves that meet the criteria of providing a balance of plus error, astigmatism, half the minus error for a distant object and astigmatism for a near object. Prescriptions of +3.00 DS ( ) −1.00 DC and −2.00 DS ( ) −1.00 DC are of significant power and represent typical prescriptions in which design control is important. It can be seen that error by error there is little difference due to thickness.

TABLE 12

| Rx | +3.00 sph | −1.00 cyl | −2.00 sph | −1.00 cyl |
|---|---|---|---|---|
| True Power | | | | |
| Base Curve | −6.25 | | −7.75 | |
| | Dress | Industrial | Dress | |
| Center Thickness | 2.99 mm | 6.01 mm | 2.2 mm | 3.2 mm |
| Short fitting dist | | | | |
| At Point A: | | | | |
| Sph. merid. error | −0.023 | −0.017 | −0.082 | −0.085 |

TABLE 12-continued

| Cyl. merid. error | −0.160 | −0.165 | 0.006 | 0.005 |
|---|---|---|---|---|
| Astigmatic error | −0.137 | −0.148 | 0.088 | 0.089 |
| Near astig. error | 0.008 | −0.003 | 0.035 | 0.055 |
| At point B: | | | | |
| Sph. merid. error | −0.042 | −0.051 | 0.099 | 0.098 |
| Cyl. merid. error | −0.094 | −0.110 | −0.052 | −0.049 |
| Astigmatic error | −0.052 | −0.059 | −0.151 | −0.148 |
| Near astig. error | −0.136 | −0.153 | −0.141 | −0.065 |
| Long fitting dist | | | | |
| At point A: | | | | |
| Sph. merid. error | −0.147 | −0.149 | 0.043 | 0.038 |
| Cyl. merid. error | −0.191 | −0.198 | 0.055 | 0.052 |
| Astigmatic error | −0.044 | −0.049 | 0.011 | 0.014 |
| Near astig. error | 0.094 | 0.095 | −0.051 | −0.034 |
| At point B: | | | | |
| Sph. merid. error | −0.067 | −0.077 | 0.156 | 0.154 |
| Cyl. merid. error | −0.170 | −0.187 | 0.132 | 0.129 |
| Astigmatic error | −0.103 | −0.110 | −0.024 | −0.025 |
| Near astig. error | −0.176 | −0.195 | 0.100 | 0.080 |

It is generally thought that lenses having different indices of refraction behave differently. However, if the same concave radius of curvature, or standard 1.53 base curve, is used, lenses having widely variant indices of refraction behave very much the same and a base curve that is selected for one index can be used with nearly optimum benefit for another. FIG. 10 shows the effect of base-curve selection on the field of view in terms of lens semi-diameter within tolerance (±0.13 D) for an average fitting position for the prescription +3.00 DS ( ) −2.00 DC. Performance of lenses of 1.586 and 1.70 index of refraction are compared with lenses of 1.51 index. 1.51 is selected as an average of 1.49 (allyl resin) and 1.523 (Crown glass). FIG. 11 is a similar comparison for a negative prescription of −3.00 DS ( ) −2.00 DC. FIG. 12 shows the base curves that would be selected to provide maximum field within tolerance for the three indices of refraction of various spherical prescriptions combined with a −1.00 D cylinder for an average fitting position. Since index of refraction does not, from a practical view, alter choice of base curves to achieve the desired maximum performance, the principles of my invention are not limited by index but apply to an index range from 1.48 to 1.70.

Table 13 for the plus prescription range and Table 14 for the minus prescription range describe a complete lens series that embodies the concepts of my invention. With the information therein presented anyone knowledgeable in the art can select the proper curvatures and calculate the necessary figures—thickness and front curve—for any given prescription and desired thickness requirements. The concave base curves in true-power 1.586 curvatures are listed in 0.25 D steps. These tables are based on the balancing of the errors at the 28° points A and B as was discussed with respect to Tables 2, 9 and 10. However, these curvatures would also substantially meet the requirements of the maximum-field or minimum-square-error criteria.

It should also be pointed out that performance that is nearly optimum can be obtained by using these Tables 13 and 14 for materials having indices of refraction other than 1.586, providing the actual curvatures (reciprocal radii) indicated in the table are used. For example, to calculate the standard 1.53 curvature that would replace the value in the table, one would use the relationship 1.53 curvature = (0.53/0.586) (1.586 curvature)

TABLE 13

| Sphere | Cylinder | | | | | | | | |
|---|---|---|---|---|---|---|---|---|---|
|  | 0.00 | −0.25 | −0.50 | −0.75 | −1.00 | −1.25 | −1.50 | −1.75 | −2.00 |
| +4.00 | 6.25 | 6.25 | 6.25 | 6.25 | 6.25 | 6.25 | 6.25 | 6.25 | 6.25 |
| 3.75 | " | " | " | " | " | " | " | " | " |
| 3.50 | " | " | " | " | " | " | " | " | " |
| 3.25 | " | " | " | " | " | " | " | " | " |
| 3.00 | " | " | " | " | " | " | " | " | " |
| 2.75 | " | " | " | " | " | " | " | " | " |
| 2.50 | " | " | " | " | " | " | " | " | " |
| 2.25 | 5.75 | 5.75 | 5.75 | " | " | " | " | " | " |
| 2.00 | " | " | " | " | " | " | " | " | " |
| 1.75 | " | " | " | 5.75 | " | " | " | 6.75 | 6.75 |
| 1.50 | " | " | " | " | 5.75 | 5.75 | " | " | " |
| 1.25 | " | " | " | " | " | " | " | " | " |
| 1.00 | " | " | " | " | " | " | " | " | " |
| 0.75 | " | " | " | " | " | 6.25 | 6.75 | 7.25 | 7.25 |
| 0.50 | " | " | " | " | 6.25 | 6.75 | " | " | " |
| 0.25 | 6.25 | 6.25 | 6.25 | 6.25 | 6.75 | " | 7.25 | " | " |
| 0.00 | 6.75 | 6.75 | 6.75 | 6.75 | 7.25 | 7.25 | " | " | 6.75 |

TABLE 14

| Sphere | Cylinder | | | | | | | | |
|---|---|---|---|---|---|---|---|---|---|
|  | 0.00 | −0.25 | −0.50 | −0.75 | −1.00 | −1.25 | −1.50 | −1.75 | −2.00 |
| 0.00 | 6.75 | 6.75 | 6.75 | 6.75 | 7.25 | 7.25 | 7.25 | 7.25 | 6.75 |
| −0.25 | " | " | 7.25 | 7.25 | " | " | " | " | " |
| −0.50 | 7.75 | 7.75 | 7.75 | 7.75 | 7.75 | 7.75 | " | " | " |
| −0.75 | 8.25 | 8.25 | 8.25 | 8.25 | " | " | " | " | " |
| −1.00 | " | " | " | " | " | " | " | " | 7.25 |
| −1.25 | " | " | " | " | " | " | " | " | " |
| −1.50 | " | " | " | " | " | " | " | " | " |
| −1.75 | " | " | " | " | " | " | " | " | " |
| −2.00 | " | " | " | " | " | " | " | " | " |
| −2.25 | " | " | " | " | " | " | " | " | " |
| −2.50 | " | " | " | " | " | " | 7.75 | " | " |
| −2.75 | 8.75 | " | " | " | " | " | " | 7.75 | " |
| −3.00 | " | " | " | " | 8.25 | " | " | " | 7.75 |
| −3.25 | " | 8.75 | " | " | " | " | " | " | " |
| −3.50 | " | " | " | " | " | 8.25 | " | " | " |
| −3.75 | " | " | 8.75 | " | " | " | 8.25 | " | " |
| −4.00 | " | " | " | " | " | " | " | " | " |
| −4.25 | " | " | " | 8.75 | 8.75 | " | " | 8.25 | " |
| −4.50 | 9.25 | " | " | " | " | " | " | " | 8.25 |
| −4.75 | " | 9.25 | " | " | " | 8.75 | " | " | " |
| −5.00 | " | " | 9.25 | " | " | " | " | " | " |
| −5.25 | " | " | " | " | " | " | 8.75 | " | " |
| −5.50 | 9.75 | " | " | 9.25 | " | " | " | 8.75 | 8.75 |
| −5.75 | " | " | " | " | 9.25 | " | " | " | " |
| −6.00 | " | 9.75 | " | " | " | 9.25 | " | " | " |

Base-curve frequency and the size of front base-curve changes together indicate the precision of the design and control the shape-magnification imbalances set up between two eyes where an anisometropia results in different base curves for the two lenses of a pair. With one exception the concave minus cylinder base curves are changed every 0.50 D of true 1.586 power, or approximately 0.45 D of 1.53 power. This frequency of base curves means that very precise control is maintained of the off-center errors and, further, that changes in base curves between the two eyes in cases of slight anisometropia never result in large jumps in base curves that give rise to significant differences in magnification between the two eyes. The system of 0.50 D concave curves results in plus and minus changes in front curves of approximately 0.25 D for most change points, in one case the change being approximately 0.75 D. This system results in magnification imbalances at change points of approximately 0.2% compared to the 0.8% to 1.0% normally found in the popular limited base-curve series.

To provide a basis for comparison with existing lens series, Table 14a lists the corresponding nominal front curvatures, for even dioptric values of sphere and cylinder prescriptions, of the lens series specified in Tables 13 and 14.

TABLE 14a

| Rx | Nominal Front Curvature | | |
|---|---|---|---|
| | 0.00 Cyl. | −1.00D Cyl. | −2.00D Cyl. |
| +4.00 | 10.25 | 10.25 | 10.25 |
| +3.00 | 9.25 | 9.25 | 9.25 |
| +2.00 | 7.75 | 8.25 | 8.25 |
| +1.00 | 6.75 | 6.75 | 7.75 |
| 0.00 | 6.75 | 7.25 | 6.75 |
| −1.00 | 7.25 | 6.75 | 6.75 |
| −2.00 | 6.25 | 5.75 | 5.25 |
| −3.00 | 5.75 | 5.25 | 4.25 |
| −4.00 | 4.75 | 4.25 | 3.25 |
| −5.00 | 4.25 | 3.75 | 3.25 |
| −6.00 | 3.75 | 3.25 | 2.75 |

As has been stated above, the use of true-power concave base curves reduces refraction errors in the zero and minus range to those residual errors due to manufacturing imperfections. Even with plus lenses, where thickness variation introduces some error, the use of true-power concave base curves either reduces this error or renders it more compatible with other aspects of my invention such as central power biasing, as discussed below.

Table 15 shows the required front tool for 60-mm-diameter plus lenses (index of 1.586) with an edge of 3.0 mm and a minimum center thickness of 3.2 mm. Prescriptions are listed at the left from +5.00 to 0.00 D, and lenses made with varying concave base curves ($D_2$) from −4.00 to −7.00 D are given across the page. The body of Table 15 shows the power of the front surface for each combination. For example, to make a +4.00 D lens with a true-power −5.00 D inside curve with specified center and edge requirements would require a +8.692 D true-power front curve.

TABLE 15

| | 1.586 Material | 1.586 Concave Tools | | | |
|---|---|---|---|---|---|
| Rx | $D_2$ | −4.00 | −5.00 | −6.00 | −7.00 |
| | +5.00 | 8.658 | 9.574 | 10.480 | 11.374 |
| | | (.106) | (.086) | (.051) | |
| | +4.00 | 7.758 | 8.692 | 9.617 | 10.531 |
| | | (.086) | (.072) | (.043) | |
| | +3.00 | 6.838 | 7.787 | 8.728 | 9.660 |
| | | (.065) | (.057) | (.036) | |
| | +2.00 | 5.897 | 6.860 | 7.815 | 8.764 |
| | | (.031) | (.043) | (.029) | |
| | +1.00 | 4.941 | 5.914 | 6.882 | 7.844 |
| | | (.009) | (.014) | (.021) | |
| | 0.00 | 3.968 | 4.950 | 5.928 | 6.903 |

TABLE 16

| | 1.586 Material | 1.53 Concave Tools | | | |
|---|---|---|---|---|---|
| Rx | $D_2$ | −4.00 | −5.00 | −6.00 | −7.00 |
| | +5.00 | 9.0462 | 10.054 | 11.048 | 12.026 |
| | | (.414) | (.290) | (.152) | |
| | +4.00 | 8.154 | 9.182 | 10.197 | 11.200 |
| | | (.398) | (.278) | (.147) | |
| | +3.00 | 7.240 | 8.285 | 9.320 | 10.344 |
| | | (.381) | (.267) | (.140) | |
| | +2.00 | 6.305 | 7.365 | 8.417 | 9.460 |
| | | (.241) | (.256) | (.135) | |
| | +1.00 | 5.353 | 6.426 | 7.493 | 8.552 |
| | | (.114) | (.120) | (.128) | |
| | 0.00 | 4.383 | 5.467 | 6.546 | 7.621 |

The figures in parentheses show the errors which would result if one used the curves required on the weakest prescriptions of the table having the same nominal front. For example, for the +5.00 D lens the required tool is +8.658 D, but if a +2.00 D lens were designed with no error with a −7.00 D inside it would require a tool of +8.764 D as shown at the extreme right of the table. If this tool were used on a +5.00 D lens, an error of 0.106 D would result. This is still within an acceptable tolerance, which is 0.125 D. However, if we select a front curve which is halfway between these two values, then the error throughout the plus range for a nominal +9 D tool would be less than 0.06 D.

Furthermore, as discussed above, it is desirable to have plus lenses slightly strong at the center so that the excess minus inherent in these lenses in off-axis areas will be partially compensated. Thus, the types of errors we achieve using true-power tools can be used to benefit the patient. In any event, all such errors can be less than 0.125 D, as can be seen from the table.

Table 16 shows what would happen with the same set of lenses if standard 1.53 tools were used in even-diopter steps on the concave side instead of true-power tools. Here we can see that the errors vary up to 0.414 D. This means that either more tools will be required to fullfill a given number of prescriptions or larger errors will result. In any event, more calculations, more complicated production methods and more tool selectivity will be necessary to provide the same accuracy.

This concept has been developed with respect to polycarbonate material. However, at the other end of the range is hard resin having an index of 1.50, and here also one can choose between true-power or standard tools. Table 17 shows the errors present if true-power tools designed for 1.50 material are used. Here the range of errors is slightly greater than in the case of the higher index material but of the same order of magnitude. The lenses could be designed, and the molds or grinding tools and the use of them simplified, if true-power methods were used. Table 18 gives the results if 1.53 tools were used on 1.50 material. Here the errors are smaller, but of the opposite sign. In other words, the tool for the weakest lens of a set is also the weakest tool. Thus, the inherent errors due to limiting tools work against the concept of correcting field errors. Conversely, the weighting of the errors for strong plus to provide a wider field of view across which the prescription is accurate works against the index error in the tool.

TABLE 17

| | 1.50 Material | 1.50 Concave tools or molds | | | |
|---|---|---|---|---|---|
| Rx | $D_2$ | −4.00 | −5.00 | −6.00 | −7.00 |
| | 5.00 | 8.599 | 9.498 | 10.383 | 11.250 |
| | | (.130) | (.105) | (.061) | |
| | 4.00 | 7.720 | 8.641 | 9.550 | 10.444 |
| | | (.106) | (.088) | (.053) | |
| | 3.00 | 6.814 | 7.754 | 8.868 | 9.603 |
| | | (.083) | (.072) | (.139) | |
| | 2.00 | 5.885 | 6.841 | 7.890 | 8.729 |
| | | (.039) | (.056) | (.064) | |
| | 1.00 | 4.935 | 5.905 | 6.869 | 7.826 |
| | | (.012) | (.019) | (.029) | |
| | 0.00 | 3.966 | 4.947 | 5.924 | 6.897 |

TABLE 18

| | 1.50 Material | 1.53 Concave tools or molds | | | |
|---|---|---|---|---|---|
| Rx | $D_2$ | −4.00 | −5.00 | −6.00 | −7.00 |
| | 5.00 | 8.393 | 9.245 | 10.084 | 10.908 |
| | | (−.035) | (−.004) | (−.008) | |

TABLE 18-continued

| | 1.50 Material | 1.53 Concave tools or molds | | |
| --- | --- | --- | --- | --- |
| Rx | $D_2$ −4.00 | −5.00 | −6.00 | −7.00 |
| 4.00 | 7.508 (−.060) | 8.382 (−.024) | 9.243 (−.002) | 10.092 |
| 3.00 | 6.600 (−.088) | 7.489 (−.041) | 8.370 (−.012) | 9.241 |
| 2.00 | 5.667 (−.074) | 6.571 (−.059) | 7.469 (−.021) | 8.358 |
| 1.00 | 4.714 (−.044) | 5.631 (−.038) | 6.542 (−.030) | 7.448 |
| 0.00 | 3.743 | 4.670 | 5.593 | 6.512 |

For minus prescriptions, there is always an error when the tools do not match the material. One can have a single front curve to be used on a wide variety of prescriptions for a constant thickness only when the concave tools match the index of the material. Thus, true-power tools have an advantage whether the index of the material being used is greater than 1.53 or less than 1.53. In either case, there are advantages in accuracy and in the design performance of the lens when true-power tools are used. The relative advantages in the true-power tools are increased when the index difference between the standard tools and the material is increased.

In principle, the central power biasing discussed above could be provided on the front lens curve, the rear curve or partly on both. However, where true-power prescriptive rear surfaces are employed, the central power bias is preferably provided on the front surface only. That is, the rear surfaces are ground or molded so that their true-power curvatures along the sphere and cylinder meridians are exact multiples of 0.25 D (or whatever other dioptric fraction is used). Each front surface curvature on the other hand, in addition to being compensated for lens thickness and index of refraction as in the prior art, is further compensated or offset to such an extent as to optimize the average performance within, for example, a 28° field of view for the lenses for which it is used.

It will be seen that I have accomplished the objects of my invention. My lens series allows in a precise manner for deviation of spectacles from normal fitting position, as well as deviations of the straight-ahead line of sight due to changes in posture. Further, my ophthalmic lens series considers in a precise manner typical scanning habits in both near-point and distant-point seeing tasks. My series optimally considers the eye's differential ability to accommodate for different types of errors, and considers off-axis errors in conjunction with errors at the optical center. My lens series substantially minimizes magnification imbalances for anisometropic prescriptions, as well as substantially minimizing the number of front and back base curves consistent with maintaining the design objective for off-axis viewing. My lens series minimizes prescription errors for lens materials having a refractive index other than 1.53, and is especially suitable for polycarbonate lenses.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of opthalmic prescriptive corrections of spherical powers and such spherical powers in combination with negative cylindrical powers, each in uniformly graduated steps of diopters and selected fractions thereof, each of said lenses having a concave rear base curvature selected in such a manner as to minimize the maximum in absolute value of the astigmatic error for distant points, the positive power error for distant points, half the negative power error for distant points, and the astigmatic error for a near point of approximately 40 centimeters, said errors being computed for an approximate angle of 28° between the line of sight of the wearer and the optical axis of the lens for both major meridians of the lens, for a first eye-to-lens distance measured from the nasal bevel of the lens to the center of rotation of the eye of approximately 24 millimeters, and for a second eye-to-lens distance similarly defined of approximately 34 millimeters for prescriptions between approximately +2.00 and −2.00 D and 32 millimeters for other prescriptions, each of said front surfaces having such a curvature as to provide an actual spherical power at the optical center of a lens formed therefrom that differs from the nominal prescriptive power of said lens by a power offset, said offset being of such a value as to minimize the maximum of said refractive errors within said angle of view.

2. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of diopters and selected to fractions thereof, each of said lenses having a concave rear base curvature selected in such a manner as to minimize the sum of the squares of the astigmatic error for distant points, the positive power error for distant points, half the negative power error for distant points, and the astigmatic error for a near point of approximately 40 centimeters, said errors being computed for an approximate angle of 28° between the line of sight of the wearer and the optical axis of the lens for both major meridians of the lens, for a first eye-to-lens distance measured from the nasal bevel of the lens to the center of rotation of the eye of approximately 24 millimeters, and for a second eye-to-lens distance similarly defined of approximately 34 millimeters for prescriptions between approximately +2.00 and −2.00 D and 32 millimeters for other prescriptions, each of said front surfaces having such a curvature as to provide an actual spherical power at the optical center of a lens formed therefrom that differs from the nominal prescriptive power of said lens by a power offset, said offset being of such a value as to minimize the maximum of said refractive errors within said angle of view.

3. An ophthalmic lens series comprising a plurality of lenses formed of transparent material of a given reference index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of diopters and selected fractions thereof, each of said lenses having a concave rear base curvature selected in such a manner as to minimize a composite error substantially equally dependent on the astigmatic error for distant points, the positive power error for distant points, half the negative power error for distant points, and the astigmatic error for a near point of approximately 40 centimeters, said errors being computed for an approximate angle of 28° between the line of sight of the wearer and the optical axis of the lens for both major meridians of the lens, for a first eye-to-lens distance measured from the nasal bevel of the lens to the center of rotation of the eye of approximately 24 millimeters and for a second eye-to-lens distance similarly defined of approximately 34 millimeters for prescriptions between approximately +2.00 and −2.00 D and 32 millimeters for other prescriptions, each of said front surfaces having such a curvature as to provide an actual spherical power at the optical center of a lens formed therefrom that differs from the nominal prescriptive power of said lens by a power offset, said offset being of such a value as to minimize the maximum of said refractive errors within said angle of view.

4. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of diopters and selected fractions thereof, each of said lenses having a concave rear base curvature selected in such a manner as to maximize the angle of the view between the line of sight of the wearer and the optical axis of the lens within which the astigmatic error for distant points, the power error for distant points, and the astigmatic error for a near point of approximately 40 centimeters are each not greater than 0.13 diopters, said errors being computed for both major meridians of the lens for an eye-to-lens distance measured from the nasal bevel of the lens to the center of rotation of the eye of approximately 29 millimeters for prescriptions between approximately +2.00 and −2.00 D and 28 millimeters for other prescriptions, each of said front surfaces having such a curvature as to provide an actual spherical power at the optical center of a lens formed therefrom that differs from the nominal prescriptive power of said lens by a power offset, said offset being of such a value as to maximize the angle of view within which said refractive errors are within said tolerance.

5. An opthalmic lens series comprising a plurality of lenses formed of transparent material having an index of refraction between 1.48 and 1.70 inclusive, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers from +4.00 D to −6.00 D and such spherical powers in combination with negative cylindrical powers from near zero to −2.00 D, each in uniformly graduated steps, each of said lenses having substantially the concave rear base curvature correspondingly indicated therefor in the following table:

| | 1.53 Concave Base Curvature | | |
| Rx | 0.00 Cyl. | −1.00 Cyl. | −2.00 Cyl. |
| --- | --- | --- | --- |
| +4.00 | −5.65 | −5.65 | −5.65 |
| +3.00 | −5.65 | −5.65 | −5.65 |
| +2.00 | −5.20 | −5.65 | −5.65 |
| +1.00 | −5.20 | −5.20 | −6.10 |
| 0.00 | −6.10 | −6.56 | −6.10 |
| −1.00 | −7.46 | −7.01 | −6.56 |
| −2.00 | −7.46 | −7.01 | −6.56 |
| −3.00 | −7.91 | [−7.16] −7.46 [−6.56] | −7.01 |
| −4.00 | −7.91 | −7.46 | −7.01 |
| −5.00 | −8.37 | −7.91 | −7.46 |
| −6.00 | −8.82 | −8.37 | −7.91 |

6. An ophthalmic lens series comprising a plurality of lenses formed of transparent material having an index of refraction between 1.48 and 1.70 inclusive, said lenses having convex spherical front surfaces and concave toric prescriptive rear surfaces with predetermined axial spacings therebetween, said prescriptive rear surfaces having base curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers from +4.00 D to −6.00 D and such spherical powers in combination with negative cylindrical powers from near zero to −2.00 D, each in uniformly graduated steps of 0.25 D, each of said lenses having substantially the 1.586 concave rear base curvature correspondingly indicated therefor in Tables 13 and 14.

7. A lens series as in claim 6 in which the spherical powers of the lenses of said series of +2.00 D or more positive spherical power are biased from the nominal prescription by an amount between approximately +0.04 and +0.10 D and in which the spherical powers of the lenses of said series of −2.00 D or more negative spherical power are biased from the nominal prescription by an amount between approximately −0.04 and −0.10 D.

8. A lens series as in claim 6 in which each of said front surfaces has such a curvature as to provide an actual spherical power at the optical center of a lens formed therefrom that differs from the nominal prescriptive power of said lens by a power offset, said offset being of such a value as to minimize the maximum refractive error of the lenses formed from said front surface within a predetermined angle of view.

9. A lens series as in claim 6 in which each of said front surfaces has such a curvature as to provide an actual spherical power at the optical center of a lens formed therefrom that differs from the nominal prescriptive power of said lens by a power offset, said offset being of such a value as to maximize the angle of view within which the refractive errors of the lenses formed from said front surface are within predetermined tolerances.

10. An ophthalmic lens series as in claim 6 in which each lens thereof has a finished prescriptive rear surface the true-power curvatures along the sphere and cylinder meridians of which differ from each other and from the corresponding curvatures of other lenses in said series by multiples of 0.25 D.

11. An ophthalmic lens series as in claim 10 in which the curvatures of said front surfaces are such as to provide an actual spherical power at the optical center of a lens formed therefrom that differs from the nominal prescriptive power of said lens by a power offset, said offset being of such a value as to minimize the maximum refractive error of said lenses within a predetermined angle of view.

12. A lens series as in claim 11 in which said predetermined angle of view is approximately 28°.

13. A lens series as in claim 11 in which the magnitude of each of said power offsets is less than or equal to 0.125 D.

14. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical power, each in uniformly graduated steps of diopters and selected fractions thereof, each of said lenses having a finished prescriptive rear surface the true-power curvatures along the sphere and cylinder meridians of which differ from each other and from the corresponding curvatures of other lenses in said series by said selected fractions of a diopter.

15. An ophthalmic lens series as in claim 14 in which the curvatures of said front surfaces are such as to provide an actual spherical power at the optical center of a lens formed therefrom that differs from the nominal prescriptive power of said lens by a power offset, said offset being of such value as to minimize the maximum refractive error of said lenses within a predetermined angle of view.

16. A lens series as in claim 14 in which said selected fraction is 0.25 D.

17. A lens series as in claim 16 in which said concave rear base curvatures are selected from a family of curvatures differing in true spherical power by multiples of 0.50 D and in which said front surface curvatures are selected from a family of curvatures differing in nominal power by multiples of 0.25 D.

18. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of 0.25 D, each of said lenses having a concave rear base curve selected from a family of curves differing in spherical power by steps of substantially 0.50 D, said front surface curvatures being selected from a family of curvatures differing in power by steps of substantially 0.25 D and being such as to provide an actual spherical power at the optical center of a lens formed therefrom that differs from the nominal prescriptive power of said lens by a power offset, said offset being of such value as to minimize the maximum refractive error of said lenses within a predetermined angle of view.

19. An ophthalmic lens series comprising a plurality of lenses formed to transparent material of a given refractive index, said lenses having convex spherical front surfaces and concave toric prescriptive rear surfaces with predetermined axial spacings therebetween, said perscriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of diopters and selected fractions thereof, the spherical powers of the lenses of said series of +2.00 D or more positive spherical power being biased from the nominal prescription by an amount between +0.04 and +0.10 D, the spherical powers of the lenses of said series of −2.00 D or more negative spherical power being biased from the nominal prescription by an amount between −0.04 and −0.10 D.

20. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of diopters and selected fractions thereof, each of said front surfaces having such a curvature as to provide an actual spherical power at the optical center of a lens formed therefrom that differs from the nominal prescriptive power of said lens by a power offset, said offset being of such a value as to minimize the maximum refractive error of the lenses formed from said front surface within a predetermined angle of view.

21. An ophthalmic lens series comprising a plurality of lenses formed of transparent material of a given refractive index, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers and such spherical powers in combination with negative cylindrical powers, each in uniformly graduated steps of diopters and selected fractions thereof, each of said front surfaces having such a curvature as to provide an actual spherical power at the optical center of a lens formed therefrom that differs from the nominal prescriptive power of said lens by a power offset, said offset being of such a value as to maximize the angle of view within which the refractive errors of the lenses formed from said front surface are within predetermined tolerances.

22. An ophthalmic lens series comprising a plurality of lenses formed of transparent material having an index of refraction between 1.48 and 1.70 inclusive, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers from 6.00 D to −6.00 D and such spherical powers in combination with negative cylindrical powers from near zero to −3.00 D, each in uniformly graduated steps, the curvatures of said front surfaces being such as to provide an actual spherical power at the optical center of a lens formed therefrom that differs from the nominal prescriptive power of said lens by a power offset, said offset being of such value as to minimize the maximum refractive error of said lenses within a predetermined angle of view, each of said lenses having substantially the concave rear base curvature correspondingly indicated therefor in the following table:

|  | 1.53 Concave Base Curvature | | | |
| --- | --- | --- | --- | --- |
| Rx | 0.00 Cyl. | −1.00D Cyl. | −2.00D Cyl. | −3.00D Cyl. |
| +6.00 | −5.50 | −6.50 | −7.00 | −6.25 |
| +5.00 | −5.50 | −6.00 | −6.00 | −6.25 |
| +4.00 | −5.50 | −6.00 | −6.00 | −5.75 |
| +3.00 | −5.25 | −5.50 | −5.75 | −5.75 |
| +2.00 | −5.00 | −5.50 | −5.50 | −6.50 |
| +1.00 | −4.50 | −5.25 | −6.00 | −4.25 |
| 0.00 |  | −6.50 | −5.25 | −4.50 |
| −1.00 |  | −7.00 | −6.25 | −5.50 |
| −2.00 | −7.00 | −7.25 | −6.75 | −6.00 |
| −3.00 | −7.50 | −7.50 | −6.50 | −6.50 |
| −4.00 | −8.00 | −7.50 | −7.00 | −7.00 |
| −5.00 | −8.50 | −8.50 | −7.75 | −7.50 |
| −6.00 | −8.75 | −8.50 | −8.25 | −8.00 |

23. A lens series as in any preceding claim in which said lenses are molded lenses.

24. A lens series as in claim 23 in which said lenses are molded polycarbonate lenses.

25. An ophthalmic lens series comprising a plurality of lenses formed of transparent molded polycarbonate resin having an index of refraction of about 1.586, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers from +4.00 D to −6.00 D and such spherical powers in combination with negative cylindrical powers from near zero to −2.00 D, each in uniformly graduated steps, each of said lenses having the concave rear base curvature correspondingly indicated therefor in the following table:

| Rx | 1.586 Concave Base Curvature | | |
|---|---|---|---|
| | 0.00 Cyl. | −1.00D Cyl. | −2.00D Cyl. |
| +4.00 | −6.25 | −6.25 | −6.25 |
| +3.00 | −6.25 | −6.25 | −6.25 |
| +2.00 | −5.75 | −6.25 | −6.25 |
| +1.00 | −5.75 | −5.75 | −6.75 |
| 0.00 | −6.75 | −7.25 | −6.75 |
| −1.00 | −8.25 | −7.75 | −7.25 |
| −2.00 | −8.25 | −7.75 | −7.25 |
| −3.00 | −8.75 | −8.25 [−7.25] | −7.75 |
| −4.00 | −8.75 | −8.25 | −7.75 |
| −5.00 | −9.25 | −8.75 | −8.25 |
| −6.00 | −9.75 | −9.25 | −8.75 |

26. An ophthalmic lens series comprising a plurality of lenses formed of molded polycarbonate resin having an index of refraction of about 1.586, said lenses having convex spherical front surfaces and concave toric prescriptive rear surfaces with predetermined axial spacings therebetween, said prescriptive rear surfaces having base curvatures along the sphere meridians thereof and curvatures along the cylinder meridians thereof selected from respective families of curvatures differing by respective selected dioptric steps, said front surfaces having curvatures selected from a family of front curvatures differing in nominal power by selected dioptric steps and being so correlated with said rear surfaces and said predetermined axial spacings as to jointly provide a full range of ophthalmic prescriptive corrections of spherical powers from +4.00 D to −6.00 D and such spherical powers in combination with negative cylindrical powers from near zero to −2.00 D, each in uniformly graduated steps of 0.25 D, each of said lenses having the 1.586 concave rear base curvature correspondingly indicated therefor in Tables 13 and 14.

* * * * *

UNITED STATES PATENT AND TRADEMARK OFFICE
CERTIFICATE OF CORRECTION

PATENT NO. : 4,310,225

DATED : January 12, 1982

INVENTOR(S) : John K. Davis

It is certified that error appears in the above-identified patent and that said Letters Patent are hereby corrected as shown below:

Column 24, line 54, delete [-7.16] and [-6.56].

Column 26, line 6, "power" should read -- powers --;

line 61, "perscriptive" should read

-- prescriptive --.

Column 28, line 11, "30 6.00 D" should read -- +6.00 D --.

Column 29, line 10, delete [-7.25].

Signed and Sealed this

Thirtieth Day of March 1982

[SEAL]

Attest:

GERALD J. MOSSINGHOFF

*Attesting Officer*     *Commissioner of Patents and Trademarks*